United States Patent
Ozeki (10) Patent No.: US 10,962,953 B2
(45) Date of Patent: Mar. 30, 2021

(54) ADJUSTMENT OF A DEVIATION OF AN AXIS POSITION OF DRIVING UNIT OF MACHINE TOOL

(71) Applicant: FANUC Corporation, Yamanashi (JP)

(72) Inventor: Shinichi Ozeki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/424,482

(22) Filed: May 29, 2019

(65) Prior Publication Data

US 2019/0384253 A1    Dec. 19, 2019

(30) Foreign Application Priority Data

Jun. 19, 2018 (JP) .............................. JP2018-116389

(51) Int. Cl.
| | |
|---|---|
| *G05B 19/42* | (2006.01) |
| *G05B 19/401* | (2006.01) |
| *G05B 19/404* | (2006.01) |
| *G06N 20/00* | (2019.01) |
| *G05B 19/402* | (2006.01) |

(52) U.S. Cl.
CPC ......... *G05B 19/402* (2013.01); *G05B 19/401* (2013.01); *G05B 19/404* (2013.01); *G06N 20/00* (2019.01); *G05B 2219/33044* (2013.01)

(58) Field of Classification Search
CPC .. G05B 19/402; G05B 19/401; G05B 19/404; G05B 2219/33044; G05B 2219/49206; G05B 2219/49176; G05B 2219/33034; G06N 20/00; B23Q 17/007
See application file for complete search history.

(56) References Cited

U.S. PATENT DOCUMENTS

| | | | | |
|---|---|---|---|---|
| 4,195,250 A | * | 3/1980 | Yamamoto ............. | G01B 7/008 318/561 |
| 4,533,858 A | * | 8/1985 | Tlaker .................... | B23Q 15/18 318/471 |
| 9,164,502 B2 | * | 10/2015 | Sakai .................... | G05B 19/404 |
| 10,384,320 B2 | * | 8/2019 | Inaguchi .............. | G05B 19/404 |

(Continued)

FOREIGN PATENT DOCUMENTS

| | | |
|---|---|---|
| JP | S60-213462 A | 10/1985 |
| JP | H7-80753 A | 3/1995 |

(Continued)

*Primary Examiner* — Ramesh B Patel
(74) *Attorney, Agent, or Firm* — Hauptman Ham, LLP (57) ABSTRACT

An adjustment necessity determination device is an adjustment necessity determination device that makes a determination, after a workpiece is machined, about a necessity to make an adjustment of a deviation of the axis position of each axis of a machine tool that has performed the machining and includes: a data acquisition unit that acquires a physical quantity relating to a cause of a deviation of the axis position of each axis of the machine tool, the physical quantity observed at the time of the machining; a time-series data storage unit that stores the physical quantity as time-series data; and an adjustment necessity judgement unit that makes a judgment about a necessity to make an adjustment of a deviation of the axis position of each axis of the machine tool based on the time-series data.

11 Claims, 5 Drawing Sheets

(56) References Cited

U.S. PATENT DOCUMENTS

| | | | |
|---|---|---|---|
| 2011/0232120 A1* | 9/2011 | Tullmann | G05B 19/404 33/701 |
| 2012/0191238 A1* | 7/2012 | Sakai | G05B 19/404 700/189 |
| 2012/0271439 A1* | 10/2012 | Yamamoto | B23Q 15/18 700/73 |
| 2013/0223946 A1* | 8/2013 | Yamamoto | B23Q 15/18 409/80 |
| 2013/0282328 A1* | 10/2013 | Sato | B23Q 17/2291 702/150 |
| 2015/0160049 A1* | 6/2015 | Oki | G01B 5/20 702/97 |
| 2017/0038761 A1* | 2/2017 | Ando | G05B 19/406 |
| 2019/0265671 A1* | 8/2019 | Ookura | G05D 3/12 |

FOREIGN PATENT DOCUMENTS

| | | |
|---|---|---|
| JP | 2000-280140 A | 10/2000 |
| JP | 2011-173197 A | 9/2011 |
| JP | 4839535 B2 | 12/2011 |
| JP | 4959028 B1 | 6/2012 |
| JP | 2012-152859 A | 8/2012 |
| JP | 5875568 B2 | 3/2016 |
| JP | 2017-33346 A | 2/2017 |
| JP | 2018-39068 A | 3/2018 |

\* cited by examiner

ADJUSTMENT OF A DEVIATION OF AN AXIS POSITION OF DRIVING UNIT OF MACHINE TOOL

RELATED APPLICATIONS

The present application claims priority to Japanese Patent Application Number 2018-116389 filed Jun. 19, 2018, the disclosure of which is hereby incorporated by reference herein in its entirety.

BACKGROUND OF THE INVENTION

1. Field of the Invention

The present invention relates to an adjustment necessity determination device.

2. Description of the Related Art

Figure 7:
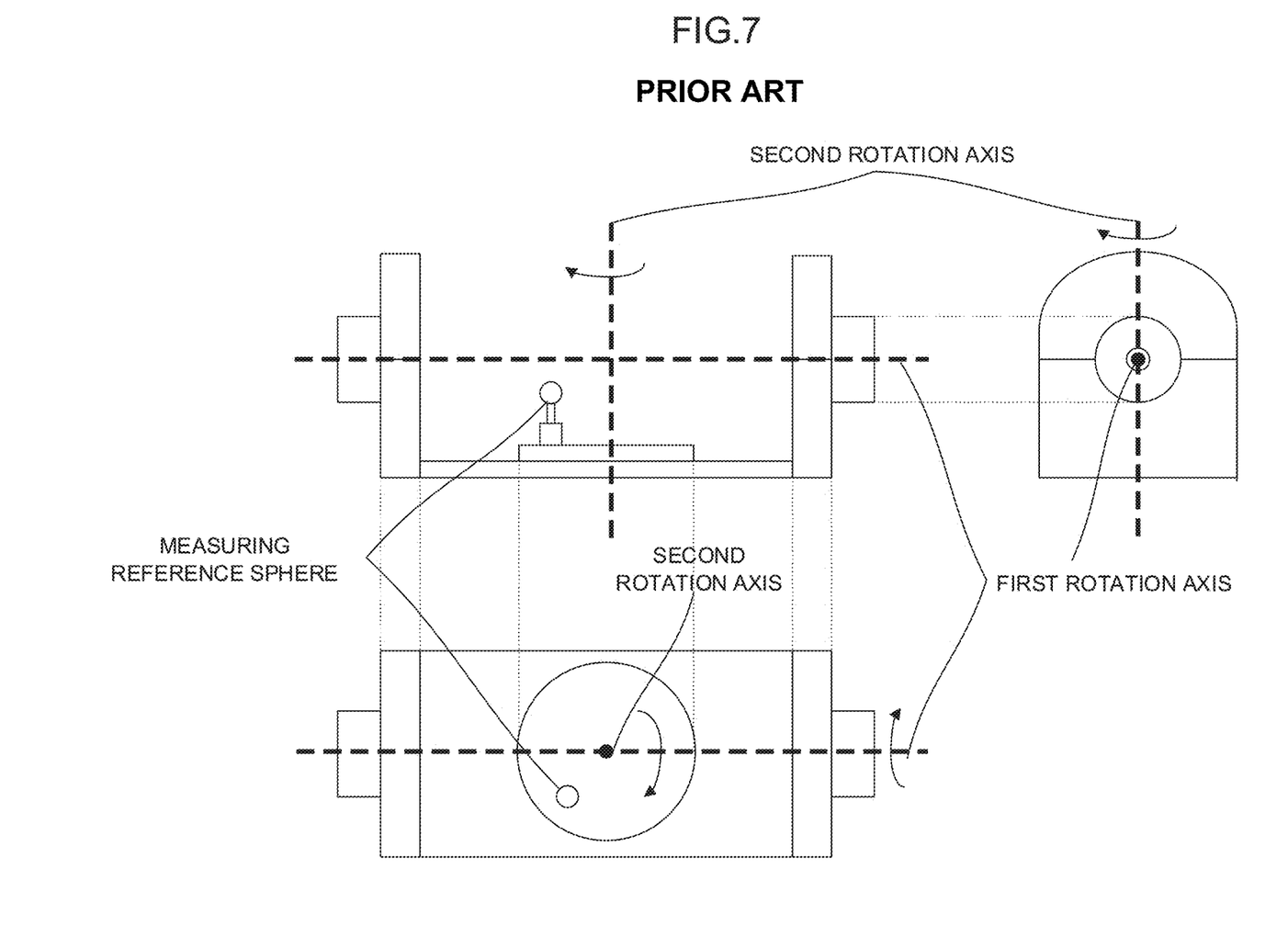
FIG. 7 is a diagram illustrating a rotary table in a five-axis machine.

When a workpiece is machined by using a machine tool provided with at least one or more axes, a deviation sometimes appears in the position of each axis by thermal displacement based on heat which is generated at the time of machining or displacement caused by vibrations. For example, in a rotary table in a five-axis machine described in FIG. 7, a first rotation axis that rotates a workpiece in the manner of a cradle and a second rotation axis that rotates the workpiece in a horizontal direction are provided. Due to displacement of parts caused by heat which is generated at the time of machining or subtle displacement of assembly positions of the parts caused by vibrations which are generated at the time of machining, a deviation sometimes appears in the center position of rotation of the first rotation axis or the second rotation axis.

To address such a deviation of the axis position, an operator who uses the machine tool measures the amount of deviation of each axis position of the machine tool at the start of machining. The operator sets an offset value in accordance with the measured amount of deviation of each axis (Japanese Patent No. 4959028, Japanese Patent No. 5875568, and so forth). For instance, in the rotary table described in FIG. 7, the position of a measuring reference sphere mounted on the rotary table is measured by using a measuring probe. As a result, the center positions of the first rotation axis and the second rotation axis are measured. Moreover, a cross offset is calculated based on the measured center positions of the rotation axes. These values are set in a numerical controller and the center positions are corrected. As a result, the center positions of the rotation axes are adjusted to ideal positions and machining accuracy is ensured. Furthermore, for example, in Japanese Patent No. 4839535, a technique of detecting a deviation of the center position of a rotation axis of a rotary table is disclosed. In Japanese Patent No. 4839535, an image of part of a machine is taken by a camera. When a positional deviation is detected based on the taken image, correction of the positional deviation is performed.

However, it is the operator who makes a determination whether, after machining is performed, a deviation of the position of the axis caused by the machining is a deviation that requires an adjustment. Consequently, even when an adjustment is actually unnecessary (the amount of deviation of the position of the axis is small), an adjustment is sometimes performed. In such a case, unnecessary adjustment operations undesirably make the overall cycle time longer. The same problem also arises even when a deviation of the position of the axis can be automatically adjusted. Although the automatic adjustment can save the operator the trouble of making an adjustment, the cycle time is made longer by the time needed to make an unnecessary automatic adjustment. For this reason, automatically determining, without manual intervention, whether or not an adjustment of the position of the axis is necessary and making an adjustment only when it is necessary are needed. Moreover, in the method by which a deviation of the axis position is directly detected by using a camera or the like as in Japanese Patent No. 4839535, an imaging device such as a camera, which is intrinsically unnecessary, is needed only to detect a deviation of the axis. Thus, a problem arises in terms of cost.

An object of some embodiments of the present invention is to provide an adjustment necessity determination device that can automatically determine whether or not making an adjustment of the axis position is necessary.

SUMMARY OF THE INVENTION

An aspect of the embodiments of the present invention is an adjustment necessity determination device that makes a determination, after a workpiece is machined, about a necessity to make an adjustment of a deviation of the axis position of each axis of a machine tool that has performed the machining. The adjustment necessity determination device includes: a data acquisition unit that acquires a physical quantity relating to a cause of a deviation of the axis position of each axis of the machine tool, the physical quantity observed at the time of the machining; a time-series data storage unit that stores the physical quantity as time-series data; and an adjustment necessity judgement unit that makes a judgment about a necessity to make an adjustment of a deviation of the axis position of each axis of the machine tool based on the time-series data.

According to the embodiments of the present invention, it is possible to automatically determine whether or not making an adjustment of the axis position is necessary. This makes it unnecessary to perform extra adjustment operations. As a result, the cycle time and the operation cost are reduced.

BRIEF DESCRIPTION OF THE DRAWINGS

These and other objects and features of the embodiments of the present invention will become apparent from the following description of exemplary embodiments with reference to the accompanying drawings in which.

DETAILED DESCRIPTION OF THE PREFERRED EMBODIMENTS

Hereinafter, embodiments of the present invention will be described along with the drawings.

Figure 1:
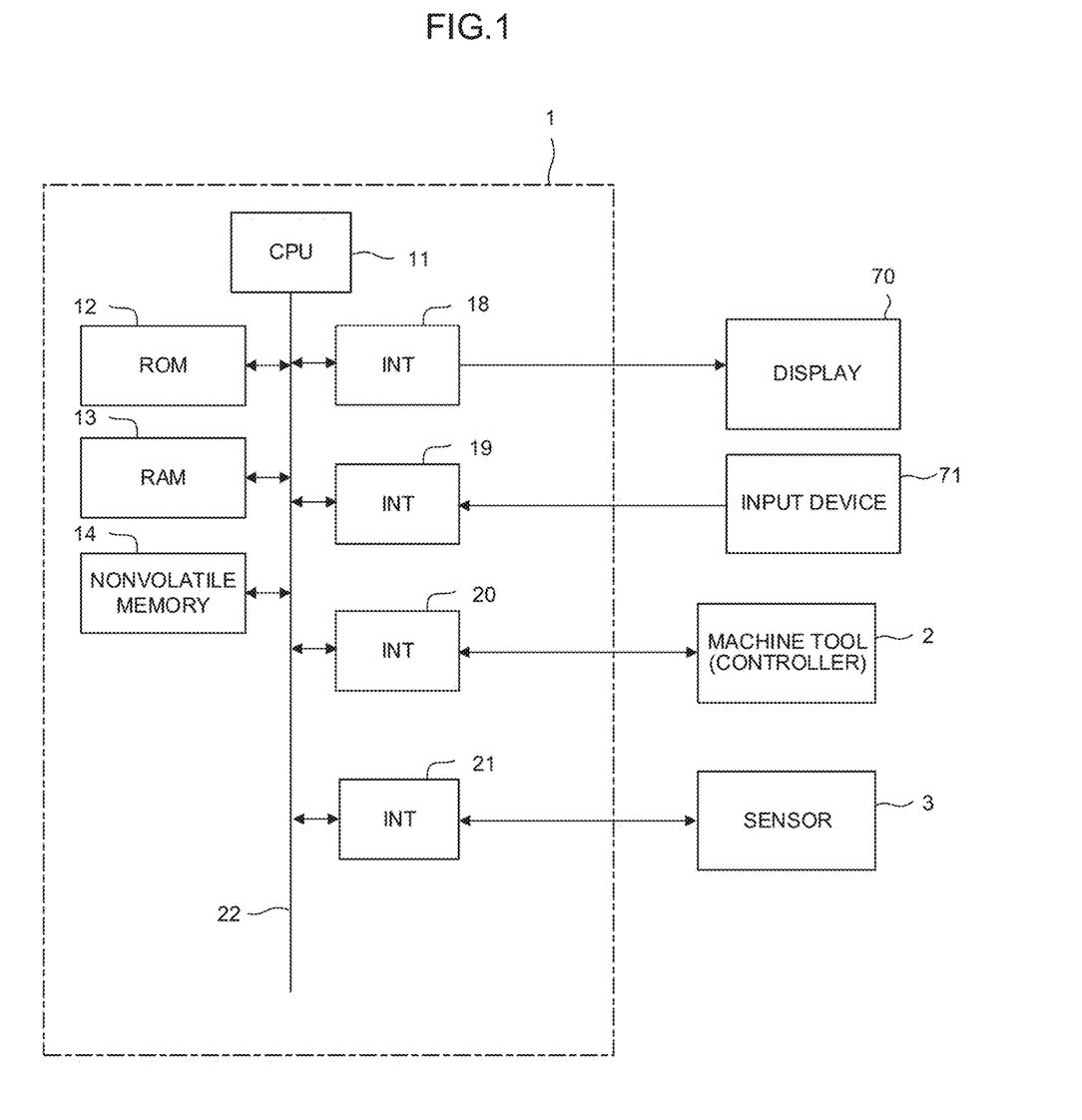
FIG. 1 is a schematic hardware configuration diagram of an adjustment necessity determination device according to an embodiment.

FIG. 1 is a schematic hardware configuration diagram describing an adjustment necessity determination device according to an embodiment of the present invention. An adjustment necessity determination device 1 of the present embodiment is implemented into a controller that controls a manufacturing machine. Moreover, the adjustment necessity determination device 1 may be implemented into a personal computer placed side by side with the controller that controls the manufacturing machine or a computer, such as a cell computer, a host computer, or a cloud server, which is connected to the controller via a network. FIG. 1 describes an example of the adjustment necessity determination device 1 implemented into a computer connected to the controller, which controls the manufacturing machine, via a network.

A central processing unit (CPU) 11 of the adjustment necessity determination device 1 according to the present embodiment is a processor that performs overall control of the adjustment necessity determination device 1. The CPU 11 reads a system program stored in read-only memory (ROM) 12 to which the CPU 11 is connected via a bus 22. The CPU 11 controls the entirety of the adjustment necessity determination device 1 in accordance with the system program. In a random access memory (RAM) 13, temporary calculation data and display data to be displayed on a display 70 are stored. Moreover, in the RAM 13, various kinds of data and the like input by an operator via an input device 71 are stored.

A nonvolatile memory 14 is, for example, a static random access memory (SRAM), a solid state drive (SSD), or the like which is backed up by an unillustrated battery. The storage state of the nonvolatile memory 14 is maintained even when the power to the adjustment necessity determination device 1 is turned off. In the nonvolatile memory 14, data input via the input device 71 and a program are stored. In the nonvolatile memory 14, data acquired, offline (via an unillustrated USB device or the like) or online (via an interface 20), from a machine tool 2 which is controlled by the controller is stored. In the nonvolatile memory 14, data or the like acquired, offline (via an unillustrated USB device or the like) or online (via an interface 21), from a sensor 3 (such as a thermal sensor, a vibration sensor, or a stress sensor) is stored. The data, the program, or the like stored in the nonvolatile memory 14 may be loaded into the RAM 13 when the data, the program, or the like is used. Moreover, various algorithms necessary for an analysis of time-series data and a system program for executing another necessary processing are written into the ROM 12 in advance.

Figure 2:
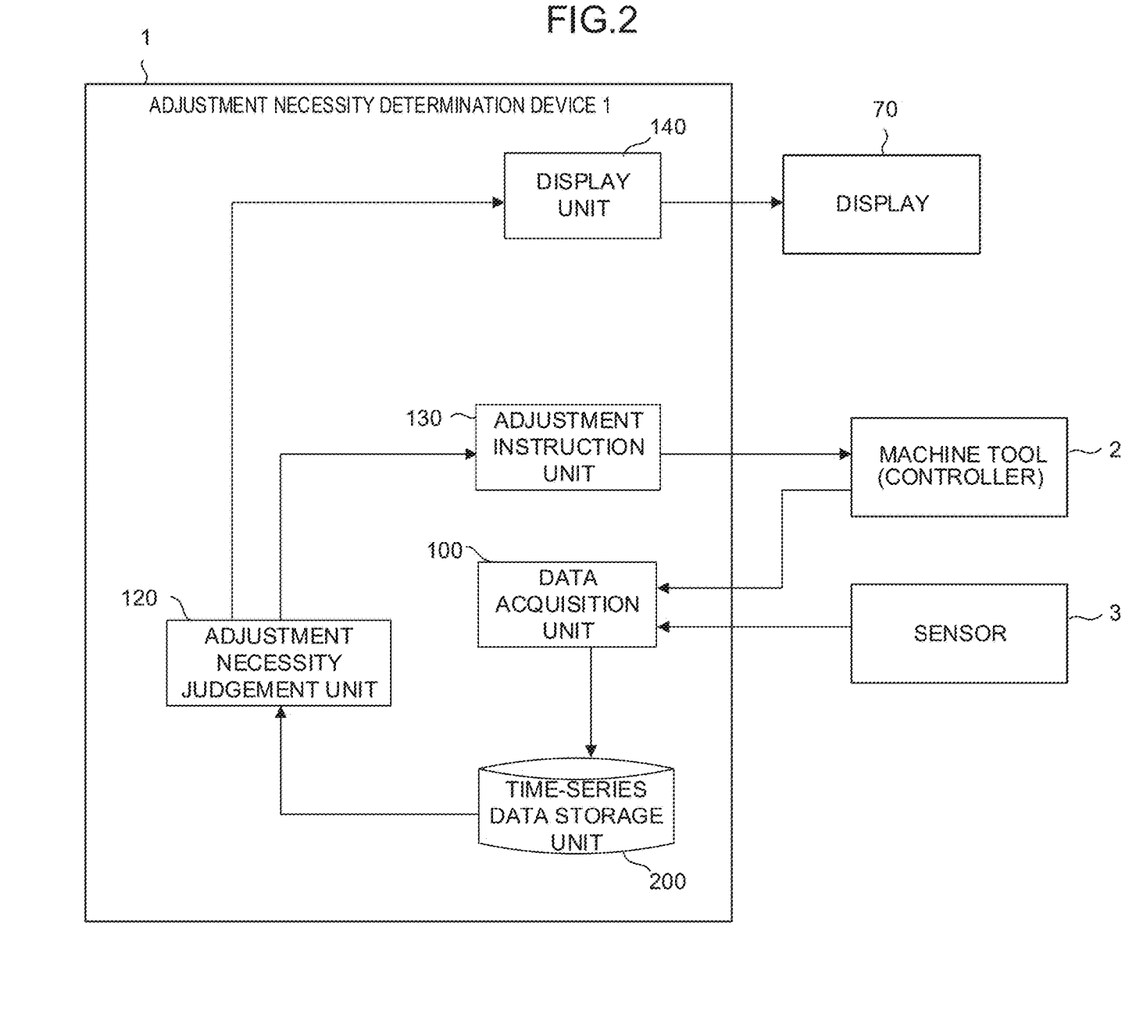
FIG. 2 is a schematic functional block diagram of the adjustment necessity determination device according to the embodiment.

FIG. 2 is a schematic functional block diagram of the adjustment necessity determination device 1 according to the embodiment of the present invention. The functions of the functional blocks described in FIG. 2 are implemented by the CPU 11 of the adjustment necessity determination device 1 described in FIG. 1 executing the system program and controlling the operations of each portion of the adjustment necessity determination device 1.

The adjustment necessity determination device 1 of the present embodiment includes a data acquisition unit 100, an adjustment necessity judgement unit 120, an adjustment instruction unit 130, and a display unit 140. A time-series data storage unit 200 that stores, as time-series data, the data acquired by the data acquisition unit 100 is provided on the nonvolatile memory 14.

The data acquisition unit 100 is a functional means that makes the time-series data storage unit 200 store, as the time-series data, data relating to a drive unit, such as a motor position, a motor speed, and a motor current/voltage, the data acquired when a workpiece is machined by the machine tool 2. Moreover, the data acquisition unit 100 is a functional means that makes the time-series data storage unit 200 store, as the time-series data, a physical quantity (a physical quantity that can be a cause of a deviation and a physical quantity that indirectly indicates the cause) relating to a cause of a deviation of the axis position measured by the sensor 3 such as a thermal sensor, a vibration sensor, or a stress sensor, which is used in the machine tool 2, at the time of machining. The data acquisition unit 100 generates the time-series data by for example, correlating time data acquired from an unillustrated real time clock (RTC) or the like, which is included in the adjustment necessity determination device 1, with each acquired data. The data acquisition unit 100 makes the time-series data storage unit 200 store each generated time-series data. Furthermore, the data acquisition unit 100 may make the time-series data storage unit 200 store the externally generated time-series data. The time-series data which the data acquisition unit 100 makes the time-series data storage unit 200 store may be a set of values (discrete values) which are correlated with time. Moreover, the time-series data may be an approximate expression (continuous values) obtained based on the discrete values. The data which is acquired by the data acquisition unit 100 is the position, speed, torque command, and current value/voltage value of a feed axis motor of the machine tool 2, for example. Furthermore, the data which is acquired by the data acquisition unit 100 is the speed, torque command, and current value/voltage value of a spindle motor. In addition, the data which is acquired by the data acquisition unit 100 may be data relating to a drive unit in machining, such as the pressure of a pump. These data which is acquired by the data acquisition unit 100 is acquired from the controller that controls the machine tool 2. Thus, these data can be acquired without the need for extra cost. Moreover, the data which is acquired by the data acquisition unit 100 may be the temperature (heat) and vibrations of each portion of the machine tool 2, the pressure (stress) which is applied to the portions, and the like. These data which is acquired by the data acquisition unit 100 is acquired in a case where the sensor 3 for observing the status of machining in the machine tool 2 is attached to the machine tool 2.

The time-series data which is acquired by the data acquisition unit 100 includes at least data relating to machining, which is acquired from the machine tool 2. Moreover, if the sensor 3 is attached to the machine tool 2, the time-series data of the physical quantity measured by the sensor 3 is used when necessary. Once the data relating to machining can be acquired, it is possible to judge whether or not a deviation that requires an adjustment has appeared in the axis position in this machining. In addition to this, if the time-series data of the physical quantity measured by the sensor 3 can be used, it is possible to improve the accuracy of judgment as to whether or not a deviation that requires an adjustment has appeared in the axis position.

Figure 3:
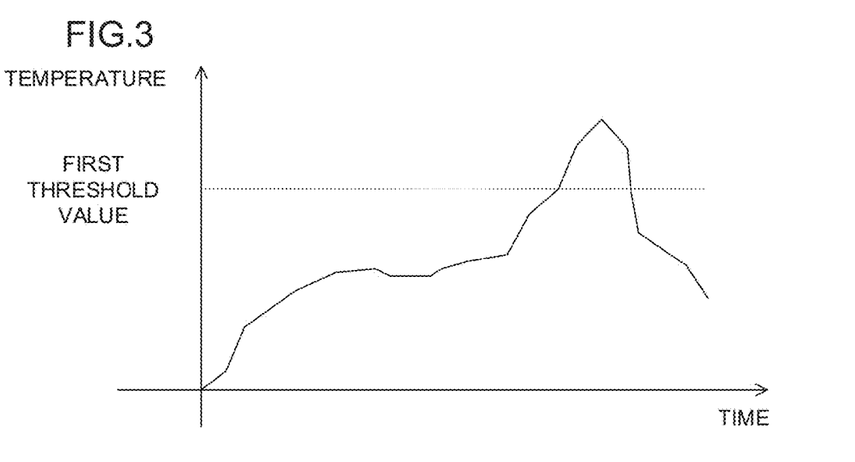
FIG. 3 is a diagram describing judgment processing of an adjustment necessity judgement unit.

The adjustment necessity judgement unit 120 is a functional means that analyzes the time-series data stored in the time-series data storage unit 200. The adjustment necessity judgement unit 120 analyzes the time-series data acquired by the data acquisition unit 100 as illustrated in FIG. 3. The adjustment necessity judgement unit 120 judges that a deviation that requires an adjustment has appeared in the axis position if the maximum value of the value of the time-series data has exceeded a predetermined first threshold value (a judgment based on the maximum value). The first threshold value indicates the value of the time-series data above which an adjustment of a deviation of an axis is absolutely necessary. The first threshold value is obtained in advance for each type of the time-series data by performing an experiment, a simulation, or the like.

Figure 4:
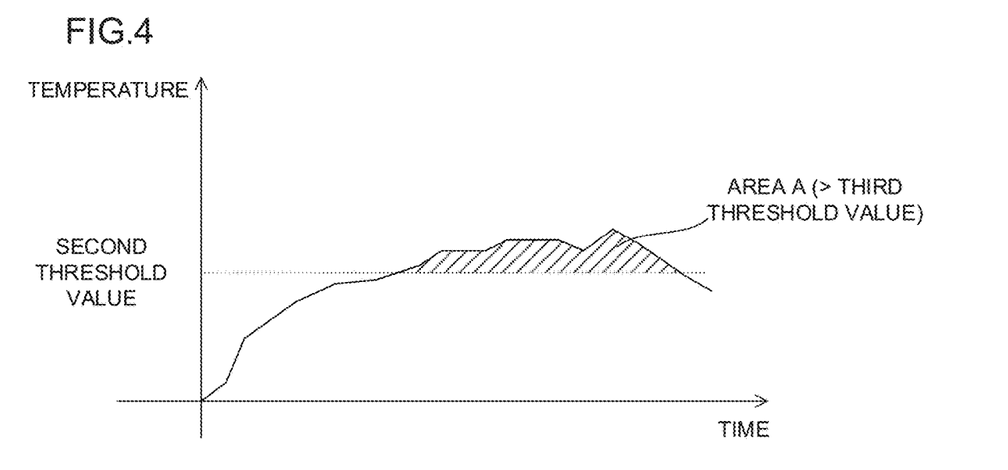
FIG. 4 is a diagram describing another judgment processing of the adjustment necessity judgement unit.
Figure 5:
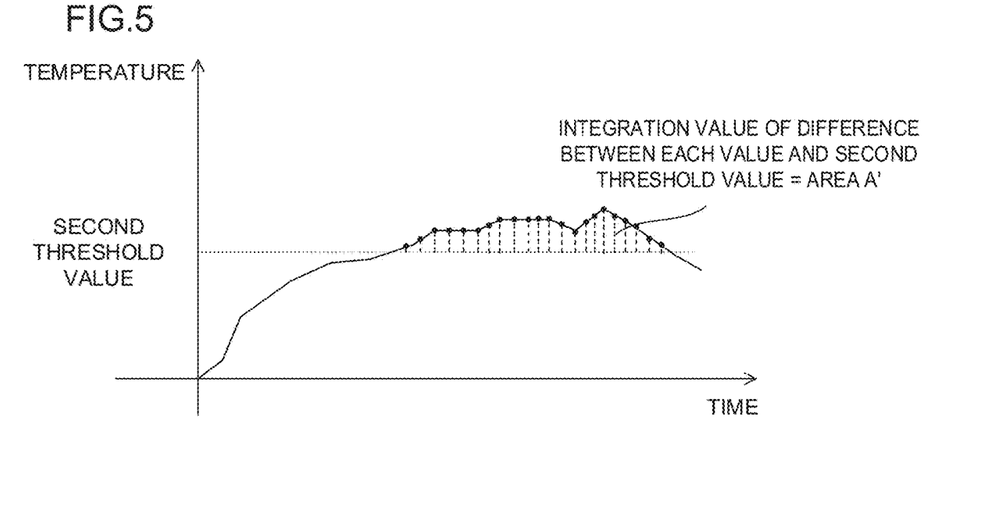
FIG. 5 is a diagram describing still another judgment processing of the adjustment necessity judgement unit.

Another judgment processing of the adjustment necessity judgement unit 120 will be described by using FIG. 4. The adjustment necessity judgement unit 120 analyzes the time-series data acquired by the data acquisition unit 100. The adjustment necessity judgement unit 120 identifies a part in which the value of the acquired time-series data exceeds a predetermined second threshold value. The adjustment necessity judgement unit 120 judges that a deviation that requires an adjustment has appeared in the axis position if the integral (an area A) of the part in which the value of the acquired time-series data exceeds the second threshold value has exceeded a predetermined third threshold value (a judgment based on the integral). The second threshold value indicates a line above which the value of the time-series data affects a deviation of the axis position. If a value obtained by accumulating a difference between the value of the time-series data and the second threshold value has exceeded the third threshold value, a determination is made that an adjustment of a deviation of the axis position is absolutely necessary. The second threshold value and the third threshold value are obtained in advance for each type of the time-series data by an experiment, a simulation, or the like. When the time-series data is expressed as a set of values (discrete values) relating to time, the integration value of a difference (a part exceeding the second threshold value) between each value and the second threshold value is used as the integral (an area A') as illustrated in FIG. 5.

The adjustment necessity judgement unit 120 performs the above-described judgment for each type of the time-series data. The adjustment necessity judgement unit 120 judges whether or not a deviation that requires an adjustment has appeared in any axis position based on the time-series data. Moreover, a first evaluation function that takes the maximum value of each time-series data as an argument may be defined in advance. The adjustment necessity judgement unit 120 may judge that an adjustment of the axis position is necessary if the value calculated by the first evaluation function has exceeded a predetermined fourth threshold value. Furthermore, a second evaluation function may be defined in advance, the second evaluation function taking the integral of each time-series data (the integral of a part in which the value of each time-series data exceeds the second threshold value) as an argument. The adjustment necessity judgement unit 120 may judge that an adjustment of the axis position is necessary if the value calculated by the second evaluation function has exceeded a predetermined fifth threshold value. Each of these evaluation functions may be what is obtained by for example, adding up a value obtained by multiplying each argument by a predetermined coefficient. Each evaluation function and each threshold value are obtained in advance for each type of the time-series data as a result of an experiment, a simulation, or the like being performed.

Moreover, the adjustment necessity judgement unit 120 may be configured as a publicly known machine learning device. When a machine learning device is used, the adjustment necessity judgement unit 120 is configured as a machine learning device that performs supervised learning, for instance. The adjustment necessity judgement unit 120 generates teacher data whose input data is each time-series data acquired by the data acquisition unit 100 and stored in the time-series data storage unit 200 (for example, a sequence of sampling points from each time-series data in a predetermined period may be used as input data). Furthermore, the adjustment necessity judgement unit 120 generates teacher data whose output data is the result indicating whether or not an adjustment of the axis position has been performed after finishing the machining in which the time-series data is acquired (that is, the result indicating whether or not an adjustment is necessary). The adjustment necessity judgement unit 120 performs supervised learning based on the teacher data. The teacher data which is used by the adjustment necessity judgement unit 120 for learning may be generated based on an analysis using computer aided engineering (CAE) analysis software or simulation software. Then, after machine learning is performed to such a level that it can be used for inference, the adjustment necessity judgement unit 120 performs estimation processing using a learned model constructed by the machine learning when the time-series data is input. After finishing the machining in which the time-series data is acquired, the adjustment necessity judgement unit 120 outputs the estimation result indicating whether or not an adjustment of the axis position is necessary. As the machine learning device which configures the adjustment necessity judgement unit 120, a multi-layer neural network, for example, is used. The machine learning device which configures the adjustment necessity judgement unit 120 may be configured as a recurrent neural network or the like that can easily handle the time-series data.

When the adjustment necessity judgement unit 120 is configured as a publicly known machine learning device, the adjustment necessity judgement unit 120 generates teacher data. In this case, input data which is used as the teacher data is the time-series data acquired by the data acquisition unit 100 and stored in the time-series data storage unit 200. Output data which is used as the teacher data is data indicating the amount of adjustment of the axis position performed on each axis after the machining in which the time-series data is acquired. The adjustment necessity judgement unit 120 performs supervised learning based on the teacher data to such a level that it can be used for inference. After performing the machine learning, the adjustment necessity judgement unit 120 performs estimation processing using a learned model constructed by the machine learning when accepting input of the time-series data. The adjustment necessity judgement unit 120 outputs the amount of adjustment of the axis position of each axis to be adjusted after the machining in which the time-series data is acquired. The adjustment necessity judgement unit 120 may compare the estimation result of the amount of adjustment of the axis position of each axis, which is output at this time, with the accuracy required for the machining which is being performed at that time and, if sufficient machining accuracy is not obtained, judge that there is a necessity to make an adjustment of the axis position.

When the adjustment necessity judgement unit 120 outputs the estimation result indicating that there is a necessity to make an adjustment of the axis position, the adjustment instruction unit 130 instructs the controller that controls the machine tool 2 to measure a deviation of the axis position of each axis of the machine tool 2 and set an offset value based on the measurement result. Moreover, when the adjustment necessity judgement unit 120 outputs the estimation result of the amount of adjustment of the axis position of each axis, the adjustment instruction unit 130 instructs the controller that controls the machine tool 2 to set an offset value of each axis based on the estimation result of the amount of adjustment of the axis position of each axis. The adjustment instruction unit 130 may not be implemented into the adjustment necessity determination device 1 if the machine tool 2 does not have a function of automatically making an adjustment of the axis position. Since the axis position deviation measurement operation and the offset value setting operation, which are performed in the machine tool 2, are already publicly known, the detailed description thereof will be omitted in the present specification.

If the adjustment necessity judgement unit 120 outputs the estimation result indicating that there is a necessity to make an adjustment of the axis position, the display unit 140 displays, on the display 70, a notification to the effect that there is a necessity to make an adjustment of the axis position. Moreover, if the adjustment necessity judgement unit 120 outputs the estimation result of the amount of adjustment of the axis position of each axis, the display unit 140 displays, on the display 70, the estimation result of the amount of adjustment of the axis position of each axis of the machine tool 2.

While the embodiment of the present invention has been described above, the present invention is not limited only to the example of the embodiment described above and can be carried out in various ways by being modified as appropriate.

Figure 6:
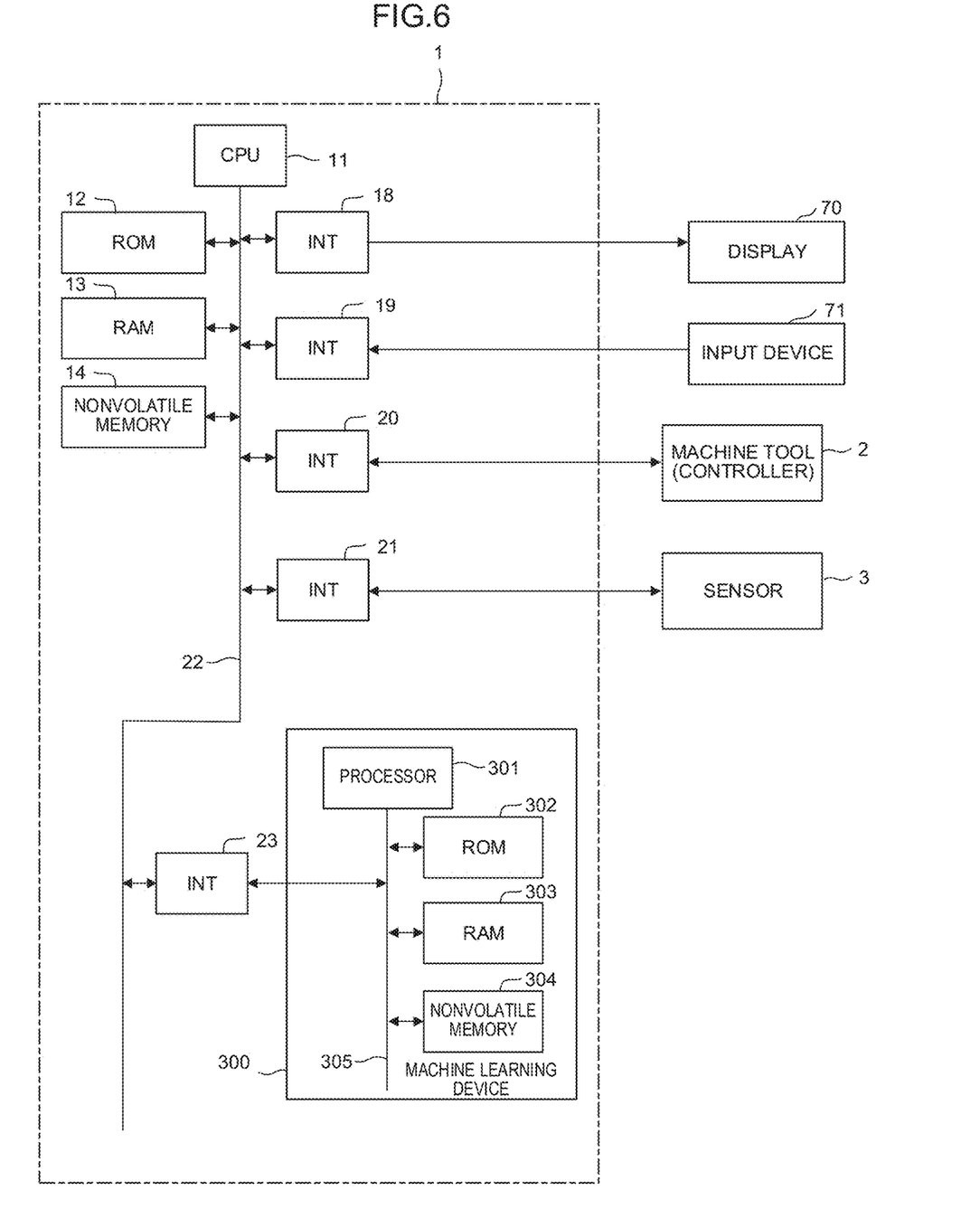
FIG. 6 is a schematic hardware configuration diagram of an adjustment necessity determination device according to another embodiment.

For example, when the adjustment necessity judgement unit 120 is configured as a publicly known machine learning device, as described in FIG. 6, a machine learning device 300 may be connected to the adjustment necessity determination device 1 via an interface 23 and the adjustment necessity judgement unit 120 may be implemented on the machine learning device 300. The machine learning device 300 includes a processor 301 that controls the entirety of the machine learning device 300, ROM 302 that stores a system program and the like, RAM 303 for performing temporary storage in each processing relating to machine learning, and nonvolatile memory 304 that is used to store a learning model and the like. The processor 301, the ROM 302, the RAM 303, and the nonvolatile memory 304 are connected to one another via a bus 305. The machine learning device 300 can observe each piece of information, which is acquired by the adjustment necessity determination device 1, via the interface 23. Moreover, the adjustment necessity determination device 1 acquires information on an adjustment of the axis position of each axis of the manufacturing machine from the machine learning device 300 via the interface 23. This configuration makes it unnecessary to execute processing relating to machine learning in the CPU 11. Thus, when the adjustment necessity determination device 1 is implemented on the controller, the adjustment necessity determination device 1 can perform learning and estimation of an adjustment of the axis position of each axis without affecting the original processing as the controller.

The invention claimed is:

1. An adjustment necessity determination device that makes a determination, after a workpiece is machined, about a necessity to make an adjustment of a deviation of an axis position of each axis of a machine tool that has performed the machining, the adjustment necessity determination device comprising:
    a data acquisition unit configured to
        receive at least one of first data relating to a drive unit of the machine tool from the machine tool or second data from a sensor in the machine tool, and
        based on the received at least one of the first data or the second data, acquire a parameter relating to a cause of a deviation of the axis position of each axis of the machine tool,
        the parameter being acquired at a time of the machining;
    a time-series data storage unit configured to receive and store the parameter as time-series data; and
    an adjustment necessity judgement unit configured to make a judgment about a necessity to make an adjustment of a deviation of the axis position of each axis of the machine tool based on the time-series data of the parameter stored in the time-series data storage unit.

2. The adjustment necessity determination device according to claim 1, wherein
    the parameter includes at least any one of a position, speed, torque command, and current value/voltage value of a feed axis motor of the machine tool, a speed, torque command, and current value/voltage value of a spindle motor of the machine tool, and a pressure of a pump which are acquired from the machine tool.

3. The adjustment necessity determination device according to claim 2, wherein
    the parameter includes at least any one of a temperature, vibrations, and a pressure which are acquired from the sensor attached to the machine tool.

4. The adjustment necessity determination device according to claim 1, wherein
    the adjustment necessity judgement unit is configured to judge that an adjustment of a deviation of the axis position of each axis of the machine tool is necessary in response to a determination that a value of the time-series data has exceeded a predetermined first threshold value.

5. The adjustment necessity determination device according to claim 4, wherein the predetermined first threshold value is obtained in advance for each type of the time-series data by performing an experiment or a simulation.

6. The adjustment necessity determination device according to claim 1, wherein
    the adjustment necessity judgement unit is configured to judge that an adjustment of a deviation of the axis position of each axis of the machine tool is necessary in response to a determination that an integral of a part in which a value of the time-series data exceeds a predetermined second threshold value has exceeded a predetermined third threshold value.

7. The adjustment necessity determination device according to claim 6, wherein the predetermined second threshold value and the predetermined third threshold value are obtained in advance for each type of the time-series data by an experiment or a simulation.

8. The adjustment necessity determination device according to claim 1, wherein
    the adjustment necessity judgement unit is configured to make a judgment about a necessity to make an adjustment of a deviation of the axis position of each axis of the machine tool based on a calculation result of a first evaluation function that takes a maximum value of the time-series data as an argument.

9. The adjustment necessity determination device according to claim 1, wherein
    the adjustment necessity judgement unit makes a judgment is configured to judge about a necessity to make an adjustment of a deviation of the axis position of each axis of the machine tool based on a calculation result of a second evaluation function that takes, as an argument, an integral of a part in which a value of the time-series data exceeds a predetermined second threshold value.

10. The adjustment necessity determination device according to claim 1, wherein
the adjustment necessity judgement unit is configured as a machine learning device with a learning model constructed by machine learning performed by using teacher data whose input data is time-series data acquired when machining is performed and whose output data is a result indicating whether or not an adjustment of a deviation of the axis position of each axis of the machine tool has been performed after the machining.

11. The adjustment necessity determination device according to claim 1, wherein
the adjustment necessity judgement unit is configured as a machine learning device with a learning model constructed by machine learning performed by using teacher data whose input data is time-series data acquired when machining is performed and whose output data is an amount of adjustment of a deviation of the axis position of each axis of the machine tool in an adjustment made after the machining.

* * * * *